United States Patent [19]

Stewart et al.

[11] 4,176,114

[45] Nov. 27, 1979

[54] PROCESS FOR MANUFACTURING SAND CORES OR MOLDS

[75] Inventors: Patrick H. Stewart; Wayne D. Woodson, both of Danville, Ill.

[73] Assignee: C L Industries, Inc., Danville, Ill.

[21] Appl. No.: 871,772

[22] Filed: Jan. 24, 1978

[51] Int. Cl.$^2$ .............................................. C08K 3/36
[52] U.S. Cl. .................................. 260/42.29; 164/16; 260/37 R; 260/38; 260/395 B
[58] Field of Search ................ 164/16; 260/DIG. 40, 260/38, 395 B, 42.29

[56] References Cited

U.S. PATENT DOCUMENTS

| | | | |
|---|---|---|---|
| 2,813,846 | 11/1957 | Farber et al. | 260/67 |
| 3,008,205 | 11/1961 | Blails | 164/16 X |
| 3,184,814 | 5/1965 | Brown | 260/DIG. 40 |
| 3,879,339 | 4/1975 | Richard | 164/16 X |

*Primary Examiner*—Sandra M. Person
*Attorney, Agent, or Firm*—Neal J. Mosely

[57] ABSTRACT

Sand molds or cores are prepared by coating sand particles with an acid-curing condensation type resin consisting of poly furfuryl alcohol or admixtures of poly furfuryl alcohol with other acid-curing resins. The resin composition is formed into a desired shape and is cured at ambient temperature over a period of between a few seconds and a few minutes by means of an acid produced by in situ oxidation of sulfur dioxide. Sulfur dioxide is introduced into the molding composition together with an oxidizing agent which effects oxidation of the sulfur dioxide within the mold or core composition. Preferably, the oxidizing agent is an organic peroxide incorporated on the sand or introduced with the resin composition. The formation of sand cores or molds from resins comprising poly furfuryl alcohol results in products having improved tensile strengths, improved hardness, and characterized by virtually no migration or furfuryl alcohol polymers to or coating of the molds or patterns used in sand core or mold preparation.

15 Claims, No Drawings

PROCESS FOR MANUFACTURING SAND CORES OR MOLDS

BACKGROUND OF THE INVENTION

1. Field of the Invention

This invention relates to new and useful improvements in processes for the preparation of sand cores and molds for foundry application and more particularly to improved processes using acid-curable resin binders for sand in which the resin is cured by in situ formation of sulfuric acid and in which the molds or cores have improved tensile strength and hardness and characterized by substantial freedom from formation of resinous coatings on the patterns for the cores or molds.

2. Description of the Prior Art

In the foundry industry, sand is coated with resin binders and formed into molds and cores for the production of precision castings. A wide variety of techniques have been developed for the manufacture of sand cores and molds. These involve the hot box technique for mold and core formation; the shell method; the "No-Bake", and the cold-box technique.

In the hot box and shell methods, sand molds and cores are formed by heating a mixture of sand a thermosetting resin at a temperature of about 300°-600° F. in contact with patterns which produce the desired shape for the mold or core. The resin is polymerized and a core or mold is formed. Procedures of this type are described in Dunn et al. U.S. Pat. No. 3,059,297 and Brown et al. U.S. Pat. No. 3,020,609.

A particular disadvantage of the hot box and shell methods is the necessity for heating the pattern boxes to 300°-600° F. to polymerize and cure the resin binder. This involves considerable expense and is generally a high cost technique.

The cold box techniques for core and mold formation involve the use of sand mixed or coated with resins which may be cured at room temperature by acid or base catalysis. Acid or base catalysts have been used in liquid, solid or gaseous form. Typical cold box processes are shown in Blaies U.S. Pat. No. 3,008,205; Dunn et al. U.S. Pat. No. 3,059,297; Peters et al. U.S. Pat. No. 3,108,340; Kottke et al. U.S. Pat. No. 3,145,438; Brown et al. U.S. Pat. No. 3,184,814; Robins U.S. Pat. No. 3,639,654; Australian Pat. No. 453,160 and British Pat. No. 1,225,984. Many of these processes involve the use of sulfur-containing acid catlayst such as benzene sulfonic acid, toluene sulfonic acid and the like.

Recently, a process has been developed for room temperature polymerization of condensation resins in which the acid-curing agent is generated in situ in the resin or on a sand-resin mix. It had previously been suggested in U.S. Pat. No. 3,145,438 to inject $SO_3$ in a form of a gas into a mixture of sand and resin to cure the resin at room temperature. It was found, however, that this process causes an instantaneous curing of the resin in the region subjected to treatment by $SO_3$ which impedes the diffusion of this gas to other parts of the resin, particularly the central parts of the mixture. Subsequently, a method was developed which avoided this difficulty. In Richard U.S. Pat. No. 3,879,339, it is disclosed that sand may be coated with a suitable oxidizing agent, such as an organic peroxide, and coated with the resin to be used in binding the sand into the form of a core or mold. The sand-resin mixture is then formed into suitable shape and treated with gaseous $SO_2$. The $SO_2$ is oxidized, in situ, to $SO_3$ and converted to sulfur-containing acid by water present in the mixture. The sulfur-containing acid which is generated in situ causes a rapid and uniform polymerization of the resin at room temperature. This process has proved successful commercially and is applicable to phenolic resins, furan resins, and urea-formaldehyde resins, as well as mixtures and copolymers thereof.

In the cold box method of Richard U.S. Pat. No. 3,879,339 it is desirable to use resin compositions which are extended by admixture with furfuryl alcohol. It has been common practice to extend phenolic resins, furan resins, and urea-formaldehyde resins by admixture with furfuryl alcohol. One serious problem, however, has arisen in connection with the use of furfuryl alcohol extended resins. In the cold box method of Richard U.S. Pat. No. 3,879,339 and in some other cold-box processes it has been found that when furfuryl alcohol extended resins are used there is an undesirable migration of furfuryl alcohol to the patterns used to form the molds or cores. This results in sticking of the resins to the patterns and makes removal of the molds or cores from the patterns quite difficult. Also, there is a tendency to build up a substantial layer of furfuryl alcohol resin condensate on the patterns. As a result, there has been a substantial need for resin compositions which may include extenders or modifiers of the furfuryl alcohol type which do not exhibit this undesirable migration to the pattern or form.

As noted above, the use of furfuryl alcohol-modified resins is known in the resin art and known in the art of foundry core manufacture, particularly as illustrated by the following references.

Treat et al. U.S. Pat. No. 2,999,829 discloses the copolymerization of furfuryl alcohol and maleic anhydride. This resin composition is disclosed to be useful in the preparation of sand base foundry shell molds.

Brown U.S. Pat. No. 3,216,075 discloses the preparation of foundry cores and molds using snad bonded by a resin consisting of a furfuryl alcohol-formaldehyde composition containing an acid catalyst and boron oxides or boron acids.

Bornstein U.S. Pat. No. 3,244,648 discloses resins of the phenol-furfuryl type.

Case et al. U.S. Pat. No. 3,212,650 discloses resins based on phenol and furfuryl alcohol modified with formaldehyde and treated with an acid catalyst.

Cleek et al. U.S. Pat. No. 3,538,035 discloses a mixture of furfuryl alcohol with a urea-formaldehyde precondensate as a preliminary step in the preparation of foundry cores or molds.

Adkins et al. U.S. Pat. No. 3,725,333 discloses the preparation of foundry cores or molds from sand and a curing agent and a phenol-formaldehyde resin binder which has been modified with furfural or furfuryl alcohol.

Johnson U.S. Pat. No. 3,755,229 discloses a foundry core composition comprising sand and a binder comprising phenolic resole resin, furfuryl alcohol and a stannic chloride or stannous chloride catalyst. The furfuryl alcohol is mixed with the preformed phenolic condensate.

Kawai et al. U.S. Pat. No. 3,893,964 discloses an acid-hardening binder for foundry sand which is a resinous composition comprising furfuryl alcohol and a urea-formaldehyde-glyoxal condensate.

The above-listed references are illustrative of the use of furfuryl alcohol as a modifier or extender for various condensation-type resins.

The various Patentees, however, did not consider the problem of migration of furfuryl alcohol and its condensation products to the forms or patterns during the curing of the sand-resin mixture. These inventors did not consider this problem and did not arrive at a solution for it.

SUMMARY OF THE INVENTION

This invention relates to new and useful improvements in methods or processes for the manufacture of sand cores or molds. In this process, sand is mixed with an acid-curing condensation type resin, formed into pre-determined shapes, and cured to produce cores or molds of satisfactory strength or hardness. The acid-curing resin used is a poly furfuryl alcohol or a mixture of poly furfuryl alcohol with other condensation type resins. The resin-sand mixture which is formed into cores or molds has a suitable oxidant incorporated therein either as an additive to the sand or in admixture with the resin. The resin-sand-oxidant mixture which is formed into the pre-determined shapes for sand cores or molds is treated with sulfur dioxide which is oxidized in situ to form sulfuric acid and effect a rapid resin cure.

DESCRIPTION OF THE PREFERRED EMBODIMENTS

This invention is an improvement on the method of process of Richard U.S. Pat. No. 3,879,339 in the discovery of an unexpected improvement obtained by the utilization of poly furfuryl alcohol in the formation of sand cores or molds according to that patent. In the Richard patent, the process disclosed is one in which sand is mixed with an acid-curing resin and an oxidizing agent. The oxidizing agent is preferably an organic peroxide, such as methyl ethyl ketone peroxide. The oxidant can be added to the sand either prior to addition of the resin or in admixture with the resin. The resin-oxidant-sand mixture is then formed into a suitable shape in a molding apparatus to provide the pre-determined shape of a sand core or mold. During or after molding of the sand-oxidant-resin composition into the form of cores or molds, the mixture is treated with sulfur dioxide at ambient temperature for a time ranging from a few seconds up to a few minutes. The sulfur dioxide is oxidized by the oxidant in situ to form sulfuric acid which is uniformly dispersed throughout the mixture and effects a fairly rapid cure of the acid-curing resin.

Resins which have been disclosed as suitable for the formation of sand cores or molds according to this process include various condensation-type resins, such as, urea-formaldehyde resins, phenol-formaldehyde resins, furan resins, and mixtures or copolymers thereof. These resins have also been modified from simple admixture or dilution up to complete copolymerization with furfuryl alcohol. In addition, the resins have been treated with silanes such as gamma-amino-propyl-triethoxy silane.

Various admixtures and co-condensates of furfuryl alcohol with other condensation type resins have been used in the preparation of sand cores and molds according to the Richard process. It has been found that as the resins are modified by increments of furfuryl alcohol so that the final product is a copolymer of furfuryl alcohol or in the extreme is a furfuryl alcohol condensate, there is generally a slight improvement in tensile strength of the sand cores and molds over sand cores and molds made using the condensation type resin without the furfuryl alcohol polymer or using the furfuryl alcohol polymer without any other condensation type resin. Thus, it is seen that the tensile curve for incremental addition of furfuryl alcohol to condensation type resins goes through a maximum value and is generally greater than the tensile strength of either the condensation type resins or the poly furfuryl alcohol condensate resins alone. It has been found further, however, that incremental addition of furfuryl alcohol to other condensation type resins, while increasing the tensile strength of sand cores and molds made therefrom, generally results in a substantial decrease in the hardness of the product cores and molds. In fact, the decline in hardness with incremental addition of furfuryl alcohol to condensation type resins is substantial and the hardness of the product sand cores and molds becomes unacceptably low as the composition approaches that of a sand core or mold made using a pure furfuryl alcohol condensate polymer.

It has been found, quite unexpectedly, that the substitution of poly furfuryl alcohol for furfuryl alcohol monomer as a modifier or extender for other condensation type resins results in a substantial improvement in the properties of the resulting resin polymers and the sand cores or molds made therewith. The tensile curve for incremental addition of poly furfuryl alcohol to other condensation type resins is substantially higher at all points than is the tensile curve for similar compositions using monomeric furfuryl alcohol. In addition, the incremental addition of poly furfuryl alcohol to other condensation type polymers quite unexpectedly results in an improvement in the hardness of sand cores and molds made from such resin compositions. Thus, while the incremental addition of monomeric furfuryl alcohol to other condensation type resins results in a substantial decrease in the hardness of sand cores and molds made from such resin compositions, the addition of incremental quantities of poly furfuryl alcohol to the same resin compositions results in an increase in the hardness of sand cores and molds made from such compositions.

In the manufacture of sand cores and molds by the Richard process using resins modified by addition of furfuryl alcohol monomer, a serious difficulty has been encountered in the migration of the furfuryl alcohol component or resin condensates thereof to the patterns used in the manufacture of the sand cores and molds. Thus, in manufacturing sand cores and molds according to the Richard process, condensation type polymers containing furfuryl alcohol monomer or cocondensed with furfuryl alcohol monomer are found to cause a substantial buildup or coating of a furfuryl alcohol resin condensate on the patterns or forms used in making the sand cores or molds and results in an unacceptable sticking of the sand cores or molds to the patterns after only two or three mold cycles. When poly furfuryl alcohol is substituted for furfuryl alcohol monomer in such compositions the process has been carried out for as many as 50 or 150 mold cycles without undesirable resin coating forming on the patterns or forms and without the undesirable sticking which is obtained using furfuryl alcohol monomer.

In this invention, a high viscosity poly furfuryl alcohol is used in place of furfuryl alcohol monomer. High viscosity poly furfuryl alcohol is added either as the sole binder resin for the sand cores or molds or in admixture or as a cocondensate with the other condensation type polymers or resins used in sand core or mold preparation. Poly furfuryl alcohol can be used by itself as a condensation type, acid-curable material which can be cured under acid conditions in accordance with the Richard process to produce satisfactory sand cores or molds. The poly furfuryl alcohol may also be admixed with urea-formaldehyde or phenol-formaldehyde precondensates or may be admixed with urea or phenol or a mixture of urea and phenol and then condensed with formaldehyde. Alternatively, the high viscosity poly furfuryl alcohol may be admixed with a condensate of urea or phenol or a mixture of urea and phenol with formaldehyde and the mixture heated to form a cocondensate. In either case, the final product, after curing, is a cocondensate of phenol and/or urea and poly furfuryl alcohol and formaldehyde.

The poly furfuryl alcohol may be prepared by heating furfuryl alcohol to a temperature somewhat under the boiling point of water under acid conditions in the substantial absence of water to produce the desired viscosity polymer. Alternatively, poly furfuryl alcohol may be prepared by air blowing or by heating furfuryl alcohol monomer with a minor amount of formaldehyde. Since the use of a high viscosity poly furfuryl alcohol as a resin precondensate or as a component of a resin precondensate mixture is a major feature of this invention, the first examples are directed to the production of this material.

EXAMPLE 1

Liquid furfuryl alcohol is charged to a reaction vessel and admixed with a small amount of a concentrated aqueous solution of a strong mineral acid such as phosphoric acid. Other strong mineral acids may also be used. Sufficient acid is added to bring the mixture to a pH in the range of 1 to 3 and preferably in the range of about 2 to 2.5.

The mixture is heated to a temperature just under the boiling point of water and maintained there for a time sufficient to effect polymerization. The polymerization is preferably carried out at about 200° F. or slightly less, although temperatures in the range from about 130° to 200° F. may be used with suitable adjustment in the reaction time. Also, it is possible to effect the polymerization by first heating at a high temperature and then cooking the mixture for a period of time at a lower temperature no less than 130° F. Under pressure, the polymerization may be carried out at a temperature above 200° F. for a shorter time.

After the furfuryl alcohol is heated under acid conditions for several hours (10 to 20 hours is satisfactory depending upon the temperature) the polymer reaches a consistency in excess of 400 cp. (at 80° F.). Higher viscosities of 500 and more may be obtained by this process and high viscosity poly furfuryl alcohol is preferred for the purposes of this invention. The high viscosity poly furfuryl alcohol product is then neutralized with a small amount of aqueous sodium hydroxide to produce a neutral pH.

EXAMPLE 2

An alternate method of preparing poly furfuryl alcohol involves heating furfuryl alcohol monomer with formaldehyde (preferably paraformaldehyde) under slightly acid conditions.

About 76.5 parts (weight) of furfuryl alcohol monomer are mixed with 21.5 parts (weight) paraformaldehyde and 1.4 parts (weight) of salicylic acid. The mixture is heated to 200° F. for about 10 hours and then neutralized with lithium hydroxide. The product is a poly furfuryl alcohol having a viscosity in excess of 1,000 cp. and contains less than 15% wt. furfuryl alcohol monomer and is substantially free of unreacted formaldehyde. The poly furfuryl alcohol product is preferably diluted with methanol (or other suitable diluent) to a viscosity of about 500 cp. for subsequent processing.

EXAMPLE 3

A resin composition is prepared by admixture of 65% wt. furfuryl alcohol monomer and 35% wt. phenol-formaldehyde resin precondensate. This resin composition is added to sand in the amount of 1% resin based on the weight of the sand. The sand also has about 0.3% wt. of methyl ethyl ketone peroxide incorporated therein either by pretreatment or added with the resin. A test biscuit is prepared by molding from this mixture and then gassed with $SO_2$ for a period of 5 seconds at room temperature.

The resin is polymerized to form a solid test biscuit which is the equivalent of a sand core or mold. The test biscuit has a tensile strength of 120 psi and a hardness of 50 (using standard foundry core hardness tests).

When this resin composition is used for several cycles in the molding apparatus for the preparation of test biscuits or of molds or cores it is found that there is a substantial buildup of furfuryl alcohol condensate resin on the patterns after two or three cycles. This buildup of resin on the patterns results in the sticking of the test biscuit or of the cores or molds to the patterns and produces substantial damage.

EXAMPLE 4

A resin composition is prepared by admixture of 65% wt. poly furfuryl alcohol (prepared in accordance with Example 1 or Example 2) and 35% wt. of phenol-formaldehyde resin pre-condensate. This resin composition is added to sand in the amount of 1% of the resin based on the weight of the sand. The sand also has about 0.3% wt. of methyl ethyl ketone peroxide incorporated therein either by pretreatment or added with the resin.

This sand-resin-oxidant composition is then formed by molding into the test biscuit and gassed with $SO_2$ for a period of 5 sec. at room temperature. The test biscuit which is obtained by polymerization of the resin mixture in the sand is substantially stronger and harder than the one obtained in Example 3. The test biscuit has a tensile strength of 150–160 psi and a hardness of 75. It should be noted in comparing Examples 3 and 4 that a hardness of 65 for a core or mold would be rejected. The product of Example 3 is therefore unsatisfactory and unacceptable commercially both in terms of hardness and tensile strength. The product of Example 4 is satisfactory in strength and hardness. In addition, when the resin composition of this Example is used in repeated mold cycles in the preparation of test biscuits or of sand cores or molds there is no buildup of poly furfuryl alcohol resin condensate on the patterns after 50 or more cylces of operation.

EXAMPLE 5

A resin composition is prepared by admixture of 65% wt. furfuryl alcohol monomer and 35% wt. urea-formaldehyde resin precondensate. This resin composition is added to sand in the amount of 1% resin based on the weight of the sand. The sand also has about 0.3% wt. of methyl ethyl ketone peroxide incorporated therein either by pretreatment or added with the resin. A test biscuit is prepared by molding from this mixture and then gassed with $SO_2$ for a period of 5 seconds at room temperature.

The resin is polymerized to form a solid test biscuit which is the equivalent of a sand core or mold. The test biscuit has a tensile strength of 120 psi and a hardness of 50 (using standard foundry core hardness tests).

When this resin composition is used for several cycles in the molding apparatus for the preparation of test biscuits or of molds or cores it is found that there is a substantial buildup of furfuryl alcohol condensate resin on the patterns after two or three cycles. This buildup of resin on the patterns results in the sticking of the test biscuit or of the cores or molds to the patterns and produces substantial damage.

EXAMPLE 6

A resin composition is prepared by admixture of 65% wt. poly furfuryl alcohol (prepared in accordance with Example 1 or Example 2) and 35% wt. of urea-formaldehyde resin pre-condensate. This resin composition is added to sand in the amount of 1% of the resin based on the weight of the sand. The sand also has about 0.3% wt. of methyl ethyl ketone peroxide incorporated therein either by pretreatment or added with the resin.

This sand-resin-oxidant composition is then formed by molding into the test biscuit and gassed with $SO_2$ for a period of 5 sec. at room temperature. The test biscuit which is obtained by polymerization of the resin mixture in the sand is substantially stronger and harder than the one obtained in Example 3. The test biscuit has a tensile strength of 150–160 psi and a hardness of 75. It should be noted in comparing Examples 3 and 4 that a hardness of 65 for a core or mold would be rejected. The product of Example 3 is therefore unsatisfactory and unacceptable commercially both in terms of hardness and tensile strength. The product of Example 4 is satisfactory in strength and hardness. In addition, when the resin composition of this Example is used in repeated mold cycles in the preparation of test biscuits or of sand cores or molds there is no buildup of poly furfuryl alcohol resin condensate on the patterns after 50 or more cycles of operation.

In the foregoing Examples, it is highly significant that high tensile strength and hardness is developed in a short curing time. A rapid cure is essential to a commercially attractive process.

EXAMPLE 7

A phenolic resin is admixed with furfuryl alcohol (5% wt. of composition) and added sand in the amount of 1% of the resin based on the weight of the sand. The sand also has about 0.3% wt. of methyl ethyl ketone peroxide incorporated therein either by pretreatment or added with the resin.

A sand mold or core is molded from this mixture and then gassed with $SO_2$ for a period of 5 sec. at room temperature.

The mold or core which is obtained by polymerization of the resin mixture is coherent and of medium strength and hardness. However, it should be noted that this resin composition, when used in sand core or mold preparation, results in a substantial migration of furfuryl alcohol resin condensate to the patterns with a substantial coating formed thereon which results in the molds or cores tending to stick to the patterns after a few cycles of operation. When this sticking occurs, there is a tendency for the molds or cores to break or to become pitted by material breaking away from the surface of the molds or cores.

When the same composition is prepared substituting 5% wt. poly furfuryl alcohol (prepared in accordance with Example 1 or Example 2) for the furfuryl alcohol monomer, a more satisfactory resin is obtained. When this resin is used in sand mold or core compositions as just described, a more satisfactory mold or core is obtained and there is no transfer of poly furfuryl alcohol condensate to the patterns producing an undesirable buildup of resin coating thereon or an undesirable sticking of the molds or cores to the patterns. It has been observed that there is a freedom from resinous buildup on the patterns for 50 or more cycles of mold operation. In addition, the sand cores or molds made using poly furfuryl alcohol modified resin are both stronger and harder (after a 5 sec. cure) than the cores or molds made using resins modified with furfuryl alcohol monomer.

EXAMPLE 8

A phenolic resin is copolymerized with furfuryl alcohol (5% wt. of composition and added to sand, as a prepolymer, in the amount of 1% of the resin based on the weight of the sand. The sand also has about 0.3% wt. of methyl ethyl ketone peroxide incorporated therein either by pretreatment or added with the resin.

A sand mold or core is molded from this mixture and then gassed with $SO_2$ for a period of 5 sec. at room temperature. The mold or core is produced by polymerization of the pre-polymer resin is not entirely satisfactory in strength and in hardness and there is an undesirable coating of the patterns with a furfuryl alcohol resin condensate after a few mold cycles. This resinous coating results in a sticking of the molds or cores which tends to break them or to mar the surfaces by removal of part of the surface material.

When a like composition is prepared substituting 5% wt. poly furfuryl alcohol (prepared in accordance with Example 1 or Example 2) for the furfuryl alcohol monomer, a more satisfactory resin is obtained. This resin when used in sand core or mold compositions as described above, produces a more satisfactory core or mold in strength and in hardness and there is no transfer of poly furfuryl alcohol resin condensate patterns after 50 or more cycles of mold operation.

EXAMPLE 9

A phenolic resin is admixed with furfuryl alcohol (10% wt. of composition) and added sand in the amount of 1% of the resin based on the weight of the sand. The sand also has about 0.3% wt. of methyl ethyl ketone peroxide incorporated therein either by pretreatment or added with the resin.

A sand mold or core is molded from this mixture and then gassed with $SO_2$ for a period of 5 sec. at room temperature.

The mold or core which is obtained by polymerization of the resin mixture is coherent and of medium strength and hardness. However, it should be noted that this resin composition, when used in sand core or mold preparation, results in a substantial migration of furfuryl alcohol resin condensate to the patterns with a substantial coating formed thereon which results in the molds or cores tending to stick to the patterns after a few cycles of operation. When this sticking occurs, there is a tendency for the molds or cores to break or to become pitted by material breaking away from the surface of the molds or cores.

When the same composition is prepared substituting 10% wt. poly furfuryl alcohol (prepared in accordance with Example 1 or Example 2) for the furfuryl alcohol monomer, a more satisfactory resin is obtained. When this resin is used in sand mold or core compositions as just described, a more satisfactory mold or core is obtained and there is no transfer of poly furfuryl alcohol condensate to the patterns producing an undesirable buildup of resin coating thereon or an undesirable sticking of the molds or cores to the patterns. It has been observed that there is a freedom from resinous buildup on the patterns for 50 or more cycles of mold operation. In addition, the sand cores or molds made using poly furfuryl alcohol modified resin are both stronger and harder (after a 5 sec. cure) than the cores or molds made using resins modified with furfuryl alcohol monomer.

EXAMPLE 10

A phenolic resin is admixed with furfuryl alcohol (25% wt. of composition) and added sand in the amount of 1% of the resin based on the weight of the sand. The sand also has about 0.3% wt. of methyl ethyl ketone peroxide incorporated therein either by pretreatment or added with the resin.

A sand mold or core is molded from this mixture and then gassed with $SO_2$ for a period of 5 sec. at room temperature.

The mold or core which is obtained by polymerization of the resin mixture is coherent and of medium strength and hardness. However, it should be noted that this resin composition, when used in sand core or mold preparation, results in a substantial migration of furfuryl alcohol resin condensate to the patterns with a substantial coating formed thereon which results in the molds or cores tending to stick to the patterns after a few cylces of operation. When this sticking occurs, there is a tendency for the molds or cores to break or to become pitted by material breaking away from the surface of the molds or cores.

When the same composition is prepared substituting 25% wt. poly furfuryl alcohol (prepared in accordance with Example 1 or Example 2) for the furfuryl alcohol monomer, a more satisfactory resin is obtained. When this resin is used in sand mold or core compositions as just described, a more satisfactory mold or core is obtained and there is no transfer of poly furfuryl alcohol condensate to the patterns producing an undesirable buildup of resin coating thereon or an undesirable sticking of the molds or cores to the patterns. It has been observed that there is a freedom from resinous buildup on the patterns for 50 or more cycles of mold operation. In addition, the sand cores or molds made using poly furfuryl alcohol modified resin are both stronger and harder (after a 5 sec. cure) than the cores or molds made using resins modified with furfuryl alcohol monomer.

EXAMPLE 11

A phenolic resin is admixed with furfuryl alcohol (90% wt. of composition) and added sand in the amount of 1% of the resin based on the weight of the sand. The sand also has about 0.3% wt. of methyl ethyl ketone peroxide incorporated therein either by pretreatment or added with the resin.

A sand mold or core is molded from this mixture and then gassed with $SO_2$ for a period of 5 sec. at room temperature.

The mold or core which is obtained by polymerization of the resin mixture is coherent and of medium strength and hardness. However, it should be noted that this resin composition, when used in sand core or mold preparation, results in a substantial migration of furfuryl alcohol resin condensate to the patterns with a substantial coating formed thereon which results in the molds or cores tending to stick to the patterns after a few cycles of operation. When this sticking occurs, there is a tendency for the molds or cores to break or to become pitted by material breaking away from the surface of the molds or cores.

When the same composition is prepared substituting 90% wt. poly furfuryl alcohol (prepared in accordance with Example 1 or Example 2) for the furfuryl alcohol monomer, a more satisfactory resin is obtained. When this resin is used in sand mold or core compositions as just described, a more satisfactory mold or core is obtained and there is no transfer of poly furfuryl alcohol condensate to the patterns producing an undesirable buildup of resin coating thereon or an undesirable sticking of the molds or cores to the patterns. It has been observed that there is a freedom from resinous buildup on the patterns for 50 or more cycles of mold operation. In addition, the sand cores or molds made using poly furfuryl alcohol modified resin are both stronger and harder (after a 5 sec. cure) than the cores or molds made using resins modified with furfuryl alcohol monomer.

EXAMPLE 12

Pure, undiluted furfuryl alcohol monomer is added to sand in the amount of 1% of the monomer based on the weight of the sand. The sand also has about 0.3% wt. methyl ethyl ketone incorporated therein either by pretreatment or in admixture with the furfuryl alcohol.

A sand core is molded from this mixture and gassed with $SO_2$ for a period of 5 sec. at room temperature to polymerize the furfuryl alcohol. The sand core or mold obtained by polymerization of the furfuryl alcohol is inferior in strength and substantially inferior in hardness. There is also a tendency for a substantial buildup of a furfuryl alcohol condensate coating on the patterns for the mold or core formation.

EXAMPLE 13

Poly furfuryl alcohol (prepared in accordance with Example 1 or Example 2) is added to sand in the amount of 1% based on the weight of the sand. The sand also has about 0.3% wt. of methyl ethyl ketone peroxide incorporated therein either by pre-treatment or in admixture with the poly furfuryl alcohol.

A sand core is molded from this mixture and then gassed with $SO_2$ for a period of 5 sec. at room temperature. This treatment effects a further polymerization of the poly furfuryl alcohol into a solid condensation-type resin which is thoroughly polymerized and cross-linked. The sand core or mold which is produced has a satisfactory strength and hardness for use in foundry operation. In addition, there is no tendency for a poly furfuryl alcohol resin condensate coating to occur on the forms or patterns used for mold or core preparation after 50 or more cycles of mold operation.

EXAMPLE 14

Five to fifteen parts by weight of poly furfuryl alcohol produced in accordance with Example 1 or Example 2 are mixed with 50 to 60 parts by weight phenol and adjusted to a substantially neutral pH. The mixture is then charged with 20–30 parts by weight of paraformaldehyde and heated to a temperature in the range of 120°–150° F.

The mixture becomes exothermic and is held at a temperature not in excess of 160°–165° F. The composition is held substantially near neutral pH by addition of small amounts of suitable alkali.

This reaction produces a phenol-formaldehyde precondensate poly furfuryl alcohol mixture having a viscosity in excess of 1,000 cp. (at 80° F.). If desired, the resin composition may be modified by addition of a small amount of gamma aminopropyl-triethoxysilane.

The resin produced, is used in forming sand cores or molds as described in Example III. The resin is preferably diluted with a very small amount of methanol to 500 cp. viscosity and may have other materials added such as catalyst which may promote a more thorough cure. When this resin mixture is used in preparation of sand molds or cores as described in Example 3 satisfactory cores or molds are obtained and there is virtually no transfer of poly furfuryl alcohol resin condensate to the patterns or forms.

Several resin blends were prepared using the composition of this Example.

Forty parts (weight) of this resin were admixed with 15 parts (weight) of furfuryl alcohol and 45 parts (weight) poly furfuryl alcohol (or Example 1 or Example 2). The resin blend is used to produce satisfactory sand molds or cores with virtually no transfer or migration of furfuryl alcohol resin condensate to patterns and no buildup of a resin layer thereon.

Eighty parts (weight) resin of this Example were admixed with 20 parts (weight) or urea-formaldehyde precondensate resin. The resin blend is used to produce satisfactory sand molds or cores with virtually no transfer or migration of furfuryl alcohol resin condensate to the patterns and no buildup of resinous layer thereon.

Thirty-two parts (weight) or the resin on this Example were admixed with 12 parts (weight) of furfuryl alcohol, 36 parts (weight) of poly furfuryl alcohol (Example 1 or Example 2) and 20 parts (weight) of urea-formaldhyde precondensate. The resin blend is used to produce satisfactory sand molds or cores with virtually no transfer or migration of furfuryl alcohol resin condensate to patterns and no buildup of resinous layers thereon.

When the same composition is prepared using a furfuryl alcohol monomer in place of the poly furfuryl alcohol, a satisfactory resin is obtained for most applications other than the preparation of foundry cores or molds. A resin composition of this type utilizing alcohol monomer in its preparation, has a very substantial transfer of furfuryl alcohol resin condensate to patterns or forms when used in the preparation of sand cores or molds and a substantial buildup of a resinous layer on the patterns or forms.

EXAMPLE 15

A urea-formaldehyde resin is admixed with furfuryl alcohol (5% wt. of composition) and added to sand in the amount of 1% of the resin based on the weight of the sand. The sand also has about 0.5 wt. of methyl ethyl ketone peroxide incorporated therein either by pretreatment or added with the resin. A sand mold or core is molded from this mixture and then gassed with $SO_2$ for a period of 5 seconds at room temperature. A satisfactory mold or core is obtained by the polymerization of the resin mixture. However, when this composition is used in sand core or mold preparation it is found that there is a substantial migration of furfuryl alcohol resin condensate to the patterns with a substantial coating formed with the result that the molds or cores stick and tend to break when removed from the patterns.

When the same composition is prepared substituting 5% wt. poly furfuryl alcohol (prepared in accordance with Example 1 or Example 2) for the furfuryl alcohol monomer a satisfactory resin is obtained. When this resin is used in sand mold or core composition as just described, a suitable mold or core is obtained and there is no transfer of polyfurfuryl alcohol resin condensate to the patterns or undesirable buildup of resin coating on the patterns.

EXAMPLE 16

A urea-formaldehyde resin is admixed with furfuryl alcohol (30% wt. of composition) and added to sand in the amount of 1% of the resin based on the weight of the sand. The sand also has about 0.5% wt. of methyl ethyl ketone peroxide incorporated therein either by pretreatment or added with the resin. A sand mold or core is molded from this mixture and then gassed with $SO_2$ for a period of 5 seconds at room temperature. A satisfactory mold or core is obtained by the polymerization of the resin mixture. However, when this composition is used in sand core or mold preparation it is found that there is a substantial migration of furfuryl alcohol resin condensate to the patterns with a substantial coating formed with the result that the molds or cores stick and tend to break when removed from the patterns.

When the same composition is prepared substituting 30% wt. poly furfuryl alcohol (prepared in accordance with Example 1 or Example 2) for the furfuryl alcohol monomer a satisfactory resin is obtained. When this resin is used in sand mold or core compositions as just described, a suitable mold or core is obtained and there is no transfer of poly furfuryl alcohol resin condensate to the patterns or undesirable buildup of resin coating on the patterns.

EXAMPLE 17

A urea-formaldehyde resin is admixed with furfuryl alcohol (90% wt. of composition) and added to sand in the amount of 1% of the resin based on the weight of the sand. The sand also has about 0.4% wt. of methyl ethyl ketone peroxide incorporated therein either by pretreatment or added with the resin. A sand mold or core is molded from this mixture and then gassed with $SO_2$ for a period of 5 seconds at room temperature. A satisfactory mold or core is obtained by the polymerization of the resin mixture. However, when this composition is used in sand core or mold preparation it is found that there is a substantial migration of furfuryl alcohol resin condensate to the patterns with a substantial coating formed with the result that the molds or cores stick and tend to break when removed from the patterns.

When the same composition is prepared substituting 90% wt. poly furfuryl alcohol (prepared in accordance with Example 1 or Example 2) for the furfuryl alcohol monomer a satisfactory resin is obtained. When this resin is used in sand mold or core composition as just described, a suitable mold or core is obtained and there is no transfer of poly furfuryl alcohol resin condensate to the patterns or undesirable buildup of resin coating on the patterns.

EXAMPLE 18

A mixture of furfuryl alcohol and a urea-formaldehyde resin is prepared. Phenol and furfuryl alcohol and paraformaldehyde are heated together to produce a phenol formaldehyde pre-condensate admixture with furfuryl alcohol. The urea-formaldehyde-furfuryl alcohol precondensate and phenol-formaldehyde-furfuryl alcohol admixture are mixed with poly furfuryl alcohol and heated at a temperature of about 120°-160° F. for several hours until a viscous liquid pre-polymer admixture is obtained.

When this co-condensate is mixed with sand and used to prepare sand molds or cores in accordance with the procedure of Example 3, satisfactory molds or cores are produced in which there is no migration or transfer of the poly furfuryl alcohol resin condensate to the forms or patterns and no buildup of a resinous layer thereon.

The composition which is produced in accordance with this Example may utilize a wide range of proportions of the urea-formaldehyde pre-condensate and the phenol formaldehyde precondensate and may use proportions of the poly furfuryl alcohol ranging from as low as 5% to as much as 98% by weight of the total composition. Also, as seen in Example 13, above, pure poly furfuryl alcohol (or poly furfuryl alcohol containing not more than 15% wt. of furfuryl alcohol monomer) may be used.

When this resin formulation is made utilizing furfuryl alcohol monomer in place of the poly furfuryl alcohol, a satisfactory resin is obtained for other purposes but the resin is not satisfactory for formation of molds or cores due to excess migration or transfer of furfuryl alcohol resin condensate to the forms or patterns used in old or core preparation and an undesirable buildup of resinous layer on the forms or patterns.

In evaluating various furfuryl alcohol- or poly furfuryl-containing compositions, several observations were made. Furfuryl alcohol and poly furfuryl alcohol blend well with various resin compositions, e.g. phenolic, urea-formaldehyde, etc. Blends of furfuryl alcohol and/or poly furfuryl alcohol with phenolic, urea-formaldehyde, etc. resins when used in sand core or mold preparation generally produce molds or cores (at 30 seconds cure) which have higher tensile strength than the cores or molds using only the phenolic, urea-formaldehyde, etc. resin or using a fully cured 100% furfuryl alcohol condensate resin.

The use of poly furfuryl alcohol in the resin compositions for sand core or mold preparation produces cores or molds which have tensile strengths (at 30 seconds cure) 30% higher than are obtained using resin compositions containing furfuryl alcohol monomer. Also, the use of poly furfuryl alcohol in the resin composition for sand core or mold preparation produces cores or molds having a hardness (at 30 seconds cure) 50% greater than are obtained using resin compositions containing furfuryl alcohol monomer. In fact, incremental blending of furfuryl alcohol in phenolic, urea-formaldehyde, etc. resin compositions improves the tensile strengths but decreases the hardness of sand cores or molds prepared from the resin composition. Incremental blending of poly furfuryl alcohol in phenolic, urea-formaldehyde, etc. resins improves tensile strengths and increases the hardness (30 seconds cure) of sand cores or molds prepared from the resin composition (the tensile and hardness curves go through maxima and declines slightly as the resin composition approaches 100% poly furfuryl alcohol condensate). Incremental blending of poly furfuryl alcohol also results in cost reduction because of a substantial reduction in the amount of catalyst used.

While this invention has been described fully and completely in the foregoing examples, it should be understood that the conditions of preparation and utilization of the resin may be varied without departing from the intended inventive concept. Thus, it is necessary to use a viscous poly furfuryl alcohol (containing about 5-20% furfuryl alcohol monomer) in preparing the urea-formaldehyde or phenol formaldehyde or urea-phenol formaldehyde resin blends or pre-condensates. The poly furfuryl alcohol may be mixed with the phenolic, urea-formaldehyde, etc. resin pre-condensates and used as a mixture or may be mixed with the urea and/or phenol and subsequently condensed with formaldehyde or may be mixed with a pre-condensate of formaldehyde and urea and/or phenol and heated to form a co-condensate therewith. The compositions may also contain 1-10% of a dilower alkyl ester of a lower molecular weight saturated dibasic acid as an additional curing agent for the resin. Also, the resin compositions may be diluted with methanol or other suitable diluent to a viscosity of 450-600 cp. suitable for coating sand in the preparation of cores or molds.

We claim:

1. A process for the manufacture of sand cores or molds which comprises mixing sand with an acid-curing condensation-type resin comprising high viscosity poly furfuryl alcohol, adding a liquid or solid oxidant to said sand, forming said resin-sand-oxidant mixture into a predetermined shape, treating said shaped resin composition with sulfur dioxide at ambient temperature for a period between a few seconds and a few minutes to form sulfuric acid in situ and effect a rapid resin cure.

2. A process according to claim 1 in which said condensation type resin consists essentially of poly furfuryl alcohol or an admixture of poly furfuryl alcohol with a phenol-formaldehyde or urea-formaldhyde or phenol-urea-formaldehyde precondensate resin or a cocondensate of poly furfuryl alcohol with a phenol-formaldehyde or urea-formaldehyde or phenol-urea-formaldehyde precondensate resin.

3. A process according to claim 1 in which said poly furfuryl alcohol is prepared by heating furfuryl alcohol monomer to a temperature of about 130°-200° F. and a pH of 1-3 in the substantial absence of water until a polymer having a viscosity greater than 400 cp. at 80° F. is obtained.

4. A process according to claim 1 in which said poly furfuryl alcohol is prepared by heating furfuryl alcohol monomer in admixture with a minor amount of formaldehyde until a high viscosity polymer is obtained.

5. A process according to claim 2 in which said poly furfuryl alcohol is prepared by heating furfuryl alcohol monomer to a temperature of about 130°-200° F. and a pH of 1-3 in the substantial absence of water until a polymer having viscosity greater than 400 cp. at 80° F. is obtained.

6. A process according to claim 2 in which said poly furfuryl alcohol is prepared by heating furfuryl alcohol monomer in admixture with a minor amount of formaldehyde until a high viscosity polymer is obtained.

7. A process according to claim 1 in which said resin consists essentially of poly furfuryl alcohol containing less than 15% furfurfuryl alcohol monomer.

8. A process according to claim 7 in which said condensation type resin consists essentially of poly furfuryl alcohol or an admixture of poly furfuryl alcohol with a phenol-formaldehyde or urea-formaldehyde or phenol-urea-formaldehyde precondensate resin or a cocondensate of poly furfuryl alcohol with a phenol-formaldehyde or urea-formaldehyde or phenol-urea-formaldehyde precondensate resin.

9. A process according to claim 7 in which said poly furfuryl alcohol is prepared by heating furfuryl alcohol monomer to a temperature of about 130°-200° F. and a pH of 1-3 in the substantial absence of water until a polymer having viscosity greater than 400 cp. at 80° F. is obtained.

10. A process according to claim 1 in which said resin composition is an admixture of poly furfuryl alcohol and a phenol-formaldehyde, urea-formaldehyde or phenol-urea-formaldehyde precondensate resin.

11. A process according to claim 10 in which said poly furfuryl alcohol is prepared by heating furfuryl alcohol monomer to a termperature of about 130°-200° F. and a pH of 1-3 in the substantial absence of water until a polymer having viscosity greater than 400 cp. at 80° F. is obtained.

12. A process according to claim 10 in which said poly furfuryl alcohol is prepared by heating furfuryl alcohol monomer in admixture with a minor amount of formaldehyde until a high viscosity polymer is obtained.

13. A process according to claim 1 in which said resin comprises a cocondensate of poly furfuryl alcohol with a phenol-formaldehyde, urea-formaldehyde or phenol-urea-formaldehyde precondensate resin.

14. A process according to claim 13 in which said poly furfuryl alcohol is prepared by heating furfuryl alcohol monomer to a temperature of about 130°-200° F. and a pH of 1-3 in the substantial absence of water until a polymer having viscosity greater than 400 cp. at 80° F. is obtained.

15. A process according to claim 13 in which said poly furfuryl alcohol is prepared by heating furfuryl alcohol monomer in admixture with a minor amount of formaldehyde until a high viscosity polymer is obtained.

* * * * *